US012476815B2

(12) United States Patent
Kim et al.

(10) Patent No.: US 12,476,815 B2
(45) Date of Patent: Nov. 18, 2025

(54) SERVER AND METHOD FOR IDENTIFYING TARGET USER THEREOF

(71) Applicants: CRYPTO LAB INC., Seoul (KR); INDUSTRY-UNIVERSITY COOPERATION FOUNDATION HANYANG UNIVERSITY, Seoul (KR)

(72) Inventors: Sunpill Kim, Seoul (KR); Seunghun Paik, Uijeongbu-si (KR); Chanwoo Hwang, Namyangju-si (KR); Dongsu Kim, Seoul (KR); Jae Hong Seo, Seoul (KR); Junbum Shin, Suwon-si (KR); Jung Woo Kim, Seoul (KR)

(73) Assignees: CRYPTO LAB INC., Seoul (KR); INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 84 days.

(21) Appl. No.: 18/598,233

(22) Filed: Mar. 7, 2024

(65) Prior Publication Data
US 2024/0305464 A1 Sep. 12, 2024

(30) Foreign Application Priority Data

Mar. 7, 2023 (KR) .................. 10-2023-0030158
Mar. 6, 2024 (KR) .................. 10-2024-0031957

(51) Int. Cl.
*H04L 9/32* (2006.01)
*G06V 40/16* (2022.01)
*H04L 9/00* (2022.01)

(52) U.S. Cl.
CPC .......... *H04L 9/3231* (2013.01); *G06V 40/168* (2022.01); *G06V 40/172* (2022.01); *H04L 9/008* (2013.01)

(58) Field of Classification Search
CPC ..... H04L 9/3231; H04L 9/008; G06V 40/168; G06V 40/172; G06V 10/95; G06V 40/53
See application file for complete search history.

(56) References Cited

U.S. PATENT DOCUMENTS

| 8,687,880 B2 * | 4/2014 | Wei ............ G06V 40/171 382/159 |
| 2014/0281567 A1 * | 9/2014 | Rane ............ H04L 9/3231 713/186 |

(Continued)

*Primary Examiner* — Michael Simitoski
*Assistant Examiner* — Hany S. Gadalla
(74) *Attorney, Agent, or Firm* — Steinfl + Bruno LLP

(57) ABSTRACT

Disclosed is a server. The server includes a camera, a memory configured to store an encrypted database generated based on a plurality of feature vectors corresponding to a plurality of users, and a processor configured to acquire an image obtained by capturing a target user's face using the camera and transform a feature vector acquired from the image based on transformation and identify the target user based on the transformed feature vector and the encrypted database. The encrypted database is generated by transforming the plurality of feature vectors based on the transformation and homomorphically encrypting the plurality of transformed feature vectors. The transformation transforms components of the feature vectors into 1, −1, or 0 depending on magnitudes and signs of the components of the feature vectors.

4 Claims, 10 Drawing Sheets

(56) References Cited

U.S. PATENT DOCUMENTS

| | | | |
|---|---|---|---|
| 2020/0274709 A1* | 8/2020 | Cheon | H04L 9/3026 |
| 2020/0351097 A1* | 11/2020 | Streit | H04L 9/3231 |
| 2021/0034695 A1* | 2/2021 | Suzuki | G06F 17/16 |
| 2021/0203997 A1* | 7/2021 | Veselov | G06V 10/454 |
| 2021/0211290 A1* | 7/2021 | Jindal | H04L 9/008 |

* cited by examiner

$T_\alpha(x) = (1, -1, 0, 1, 0, 0, 1, 0, 0, -1)$ ~530

SERVER AND METHOD FOR IDENTIFYING TARGET USER THEREOF

TECHNICAL FIELD

The present disclosure relates to a server and method of identifying a target user thereof, and more particularly, to a server for identifying a target user using a feature vector and a method of identifying a target user thereof.

BACKGROUND ART

As communication technology develops and electronic devices spread, efforts are continuously made to maintain communication security between the electronic devices. Accordingly, encryption/decryption technology is used in most communication environments.

When messages encrypted by the encryption technology are delivered to the other hparty, the other party needs to perform decryption in order to use the messages. In this case, the other party wastes resources and time in the process of decrypting the encrypted data. In addition, when the third party hacks messages while the other party temporarily decrypts the messages for an operation, there is a problem in that the messages may be easily leaked to the third party.

In order to solve this problem, a homomorphic encryption method is being studied. According to the homomorphic encryption method, even if an operation is performed on encrypted messages themselves without decrypting the encrypted information, it is possible to obtain the same result as the encrypted value after an operation on a plain text. Accordingly, various types of calculations may be performed without decrypting the encrypted messages.

Recently, various methods have been developed to compare biometric information to identify users. In this case, the biometric template is encrypted to be protected from attackers.

DISCLOSURE

Technical Problem

An object of the present disclosure is to provide a server capable of quickly performing calculations without reducing accuracy and identifying users, and a method of identifying a user thereof.

Technical Solution

According to an aspect of the present disclosure, a server includes a camera, a memory configured to store an encrypted database generated based on a plurality of feature vectors corresponding to a plurality of users, and a processor configured to acquire an image obtained by capturing a target user's face using the camera and transform a feature vector acquired from the image based on transformation and identify the target user based on the transformed feature vector and the encrypted database. The encrypted database is generated by transforming the plurality of feature vectors based on the transformation and homomorphically encrypting the plurality of transformed feature vectors. The transformation transforms components of the feature vectors into 1, −1, or 0 depending on magnitudes and signs of the components of the feature vectors.

The transformation may be a transformation for transforming α components in order of a largest absolute value among the components of the feature vector into 1 or −1 depending on the signs of the components and transforming the remaining components into 0.

The processor may be configured to perform an inner product operation between the feature vectors of each of the plurality of users and the feature vector of the target user based on the transformed feature vector and the encrypted database to identify the target user.

The processor may be configured to acquire a first binary vector and a second binary vector from the transformed feature vector of the target user based on the signs of the components of the transformed feature vector of the target user, and perform the inner product operation between the feature vectors of each of the plurality of users and the feature vector of the target user based on the first binary vector, the second binary vector, and the encrypted database. The encrypted database may include an encrypted first database and an encrypted second database. The encrypted first database may be generated by encrypting the plurality of first binary vectors acquired from the plurality of transformed feature vectors. The encrypted second database may be generated by encrypting the plurality of second binary vectors acquired from the plurality of transformed feature vectors.

The processor may be configured to perform the inner product operation based on Equation below:

$$\langle x, y \rangle = \langle x^+, y^+ \rangle + \langle x^-, y^- \rangle - \langle x^+, y^- \rangle - \langle x^-, y^+ \rangle$$

Here, y is the transformed feature vector of the target user, $y^+, y^-$ are the first and second binary vectors acquired from the transformed feature vector of the target user, x is the transformed feature vectors of each of the plurality of users, and $x^+, x^-$ are the first and second binary vectors acquired from the transformed feature vectors of each of the plurality of users.

According to another aspect of the present disclosure, a method of identifying a target user by a server storing an encrypted database generated based on a plurality of feature vectors corresponding to a plurality of users includes acquiring an image obtained by capturing a target user's face using a camera, transforming the feature vector acquired from the image based on a transformation, and identifying the target user based on the transformed feature vector and the encrypted database. The encrypted database may be generated by transforming the plurality of feature vectors based on the transformation and homomorphically encrypting the plurality of transformed feature vectors. The transformation may transform components of the feature vectors into 1, −1, or 0 depending on magnitudes and signs of the components of the feature vectors.

The transformation may be a transformation for transforming α components in order of a largest absolute value among the components of the feature vector into 1 or −1 depending on the signs of the components and transforming the remaining components into 0.

The identifying may include performing an inner product operation between the feature vectors of each of the plurality of users and the feature vector of the target user based on the transformed feature vector and the encrypted database to identify the target user.

The identifying may include acquiring a first binary vector and a second binary vector from the transformed feature vector of the target user based on the signs of the components of the transformed feature vector of the target user, and performing the inner product operation between the feature vectors of each of the plurality of users and the feature vector of the target user based on the first binary vector, the second binary vector, and the encrypted database. The encrypted database may include an encrypted first database and an encrypted second database. The encrypted first database may be generated by encrypting the plurality of first binary vectors acquired from the plurality of transformed feature vectors. The encrypted second database may be generated by encrypting the plurality of second binary vectors acquired from the plurality of transformed feature vectors.

In the performing, the inner product operation may be performed based on Equation below:

$$\langle x, y \rangle = \langle x^+, y^+ \rangle + \langle x^-, y^- \rangle - \langle x^+, y^- \rangle - \langle x^-, y^+ \rangle$$

Here, y is the transformed feature vector of the target user, $y^+, y^-$ are the first and second binary vectors acquired from the transformed feature vector of the target user, x is the transformed feature vectors of each of the plurality of users, and $x^+, x^-$ are the first and second binary vectors acquired from the transformed feature vectors of each of the plurality of users.

Advantageous Effects

As described above, according to various embodiments of the present disclosure, it is possible to quickly perform the inner product operation without the deterioration in accuracy.

DESCRIPTION OF DRAWINGS

The above and other aspects, features and advantages of characteristic embodiments of the present disclosure will become more apparent from the following description in conjunction with the accompanying drawings:

FIG. 5 is a diagram for describing an example of transforming α feature vector using transformation according to an embodiment of the present disclosure;

FIG. 6 is a diagram for describing an example of acquiring a first binary vector and a second binary vector from a transformed feature vector according to an embodiment of the present disclosure;

MODE FOR INVENTION

Figure 1:
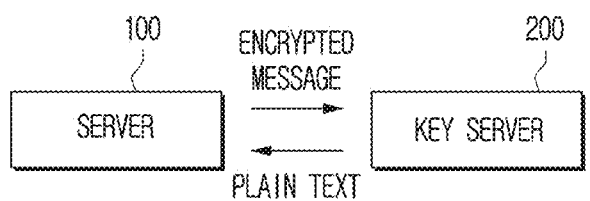
FIG. 1 is a diagram for describing a structure of a network system according to an embodiment of the present disclosure.

Hereinafter, the present disclosure will be described in detail with reference to the accompanying drawings. Encryption/decryption may be applied to an information (data) transmission process performed in the present disclosure if necessary, and all expressions describing the information (data) transmission process in the present disclosure and claims should be interpreted as including cases of encryption/decryption even if not separately stated. In the present disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the present disclosure, the term "include" has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, "value" is defined as a concept including a vector as well as a scalar value. In the present disclosure, the expressions such as "compute," and "calculate" may be replaced by an expression that produces a result of the corresponding computation or calculation. In addition, unless otherwise stated, an operation on an encrypted message to be described below means a homomorphic calculation. For example, an addition of a homomorphic encrypted message means a homomorphic addition of two homomorphic encrypted messages.

Mathematical operations and calculations of each step of the present disclosure to be described below may be implemented as computer operations by the known coding method and/or coding designed to suit the present disclosure for the corresponding operation and calculation.

Singular forms may include plural forms unless the context clearly indicates otherwise.

Specific equations to be described below are illustratively described among possible alternatives, and the scope of the present disclosure should not be construed as being limited to equations mentioned in the present disclosure.

For convenience of description, in the present disclosure, a notation is defined as follows.

a←D: select element (a) according to distribution (D)

$s_1, s_2 \in R$: Each of $s_1$ and $s_2$ is an element belonging to set R.

mod(q): Modular operation with element q $\lceil \cdot \rfloor$: Round-off internal value Hereinafter, various embodiments of the present disclosure will be described in detail with reference to the accompanying drawings.

FIG. 1 is a diagram for describing a structure of a network system according to an embodiment of the present disclosure.

Referring to FIG. 1, a network system 1000 may include a server 100 and a key server 200. The server 100 may be replaced by expressions such as, for example, local server.

The server 100 (or server device) and the key server 200 (or key server device) may be connected through a network. The network may be implemented in various types of wired and wireless communication networks, broadcasting communication networks, optical communication networks, cloud networks, etc., and each apparatus may also be connected through methods such as Wi-Fi, Bluetooth, near field communication (NFC), etc., without a separate medium.

The server 100 may identify a user using an encrypted database. For example, the server 100 may identify a user based on homomorphically encrypted representation search (HERS).

Identifying the user may include identifying whether the user is a user registered in the encrypted database. For example, the server 100 may identify which user the user is among a plurality of users included in the encrypted database.

In this disclosure, the user to be identified is referred to as a target user. The target user may be replaced by a representation of a queried user, for example.

The server 100 may store a public key and an encrypted database. For example, the server 100 may generate an encrypted database by homomorphically encrypting biometric information for a plurality of users. In this case, the public key may be used.

The biometric information may include a feature vector acquired from an image obtained by capturing a user's face. The feature vector may be replaced by an expression such as a biometric template or a template. For example, the server 100 may acquire a feature vector for the user's face from an image obtained by capturing the user's face using a feature extractor. The feature extractor may include a deep learning-based face recognition model.

In addition, the server 100 may perform an inner product operation between a feature vector of a target user and each of the plurality of feature vectors of the plurality of users constituting the encrypted database. Due to the nature of the homomorphic encrypted message, the server 100 may perform a calculation on the encrypted database without decrypting the encrypted database, and the resulting value may also be in the form of the encrypted message. In the present disclosure, the result value acquired by the calculation is referred to as a calculation result encrypted message.

The server 100 may transmit the calculation result encrypted message to the key server 200. The key server 200 may store a secret key.

The key server 200 may decrypt the calculation result encrypted message received from the server 100 using the secret key, acquire the calculation result value of the data included in the calculation result encrypted message, and transmit the calculation result value in plain text form to the server 100.

The calculation result value may include an inner product value between the feature vector of the target user and each of the plurality of feature vectors of the plurality of users included in the encrypted database.

The server 100 may identify the target user using the inner product values received from the key server 200. For example, the server 100 may identify inner product values that are greater than a threshold value among the received inner product values, and identify a user with the largest inner product value among the identified inner product values as the target user.

Figure 2:
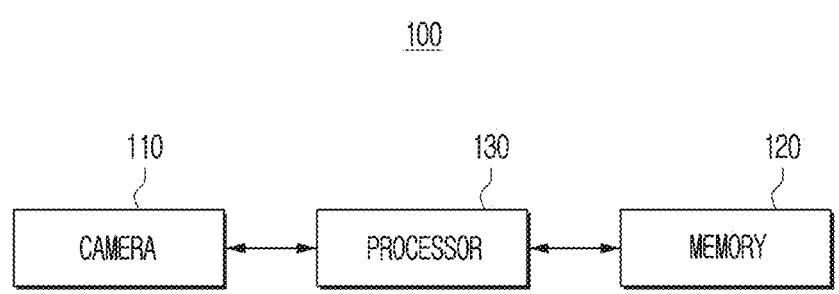
FIG. 2 is a block diagram illustrating a configuration of a server according to an embodiment of the present disclosure.

FIG. 2 is a block diagram illustrating a configuration of a server according to an embodiment of the present disclosure.

Referring to FIG. 2, the server 100 includes a camera 110, a memory 120, and a processor 130.

The camera 110 may perform capturing under the control of the processor 130. For example, the camera 110 may transform the captured image into an electrical signal and generate image data based on the transformed signal. For example, a subject is transformed into an electrical image signal through a semiconductor optical device (charge coupled device (CCD)), and the transformed image signal may be amplified and transformed into a digital signal and then processed. For example, the camera 110 may be implemented as an RGB camera.

The memory 120 is a component for storing an O/S for driving the server 100 or various instructions and/or software, data, etc., related to the generation and calculation processing of the homomorphic encrypted message to be described later. The memory 120 may be implemented in various forms such as RAM, ROM, flash memory, HDD, external memory, and memory card, but is not limited to any one.

The memory 120 may store the message and public key to be encrypted. The message may include a feature vector. In addition, the memory 120 may store the encrypted databases. The encrypted database may be generated by homomorphically encrypting a plurality of feature vectors corresponding to a plurality of users.

The processor 130 may control a general operation of the server 100. For example, the processor 130 may execute one or more instructions stored in the memory 120, so the server 100 may control the general operations for generating the encrypted database based on the homomorphic encryption and identifying the user based on the encrypted database.

The processor 130 may be composed of a single device such as a central processing unit (CPU) and an application-specific integrated circuit (ASIC), or may be composed of a plurality of devices such as a CPU and a graphics processing unit (GPU).

When the message is input, the processor 130 stores the message in the memory 120. The processor 130 may use various setting values and programs stored in the memory 120 to homomorphically encrypt the message. In this case, the public key may be used.

The processor 130 may generate and use a public key required to perform encryption by itself, or may receive and use the public key from an external electronic device.

When generating a key by itself, the processor 130 may generate a public key using a ring-LWE technique. Specifically, the processor 130 may first set various parameters and rings and store the parameters and rings in the memory 120. Examples of the parameters may include a length of a plain text message bit, a dimension k, a rank k, sizes of public and secret keys, and the like. There are various formats for the homomorphic encrypted message, and the processor 130 may set the ring according to the encrypted message method according to the method set by the user or the predetermined method. For example, the above-described homomorphic encrypted message type may be a CKKS scheme, a RLWE scheme, etc.

The ring may be expressed by Equation 1 below:

$$R = Z_q[X]/f(x) \qquad \text{[Equation 1]}$$

Here, R denotes a ring, Zq denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient Zq. Specifically, when n is Φ(N), it refers to polynomials that may be calculated as the remainder of dividing the polynomial by an N-th cyclotomic polynomial. f(x) denotes ideal of Zq[x] generated by the f(x). The Euler totient function Φ(N) means the number of natural numbers that is coprime to N and smaller than N. When $\Phi_N(x)$ is defined as an N-th cyclotomic polynomial, the ring may also be expressed by Equation 2 below.

$$R = Z_q[X]/\Phi_N(x) \qquad \text{[Equation 2]}$$

When such a ring is established, the processor 130 may calculate the secret key sk from the ring as shown in Equation 3 below. The secret key may be stored in the key server 200.

$$sk \leftarrow (1, s(x)), s(x) \in R \qquad \text{[Equation 3]}$$

Here, s(x) means a polynomial generated randomly with small coefficients.

When the ring and secret key are selected, the processor 130 calculates a first random polynomial a(x) from the ring. The first random polynomial may be expressed by Equation 4 below.

$$a(x) \leftarrow R \qquad \text{[Equation 4]}$$

In addition, the processor 130 may calculate an error. Specifically, the processor 130 may extract an error from a discrete Gaussian distribution or a distribution statistically close to the discrete Gaussian distribution. This error may be expressed by Equation 5 below.

$$e(x) \leftarrow D^n_{aq} \qquad \text{[Equation 5]}$$

When the error is calculated, the processor 130 may calculate a second random polynomial by performing a modular operation on the error in the first random polynomial and the secret key. The second random polynomial may be expressed by Equation 6 below.

$$b(x) = -a(x)s(x) + e(x) \pmod{q} \qquad \text{[Equation 6]}$$

Finally, the public key pk is set to include the first random polynomial and the second random polynomial, as shown in Equation 7 below.

$$pk = (b(x), a(x)) \qquad \text{[Equation 7]}$$

Since the above-described key generation method is only an example, it is not necessarily limited thereto, and it goes without saying that the public key and the secret key may be generated by other methods.

The processor 130 may generate a homomorphic encrypted message for a message. Specifically, the processor 130 may generate the homomorphic encrypted message by applying the previously generated public key to the message. In this case, the processor 120 may generate the length of the encrypted message to correspond to the size of the scaling factor.

For example, the processor 130 may generate the secret key and the public key based on various parameters. Also, when it is necessary to generate the encrypted message for the message, the processor 130 may apply the public key to the message to generate the homomorphic encrypted message. For example, the processor 130 may transform a message into a polynomial form and apply the public key to the message in the transformed polynomial form to generate the homomorphic encrypted message.

Meanwhile, the processor 130 may include encryption noise, i.e., an error, generated in the process of performing the homomorphic encryption in an encrypted message. Specifically, the homomorphic encrypted message generated by the processor 130 may be generated in a form in which a result value including a message and an error value is restored when it is decrypted using the secret key.

For example, when the homomorphic encrypted message generated by the electronic device 130 is decrypted using the secret key, the homomorphic encrypted message may be generated in a form that satisfies natures as Equation 8 below.

$$Dec(ct, sk) = \langle ct, sk \rangle = M + e \pmod{q} \qquad \text{[Equation 8]}$$

Here, <,> denotes a usual inner product, ct denotes an encrypted message, sk denotes a secret key, M denotes a plaintext message, e denotes an encryption error value, and mod q denotes a modulus of an encrypted message. q should be selected to be greater larger than a result value M obtained by multiplying a scaling factor Δ by a message. When an absolute value of the error value e is sufficiently small compared to M, a decryption value M+e of the encrypted message is a value that may replace the original message with the same precision in significant figure operation. Among the decrypted data, an error may be arranged on the least significant bit (LSB) side, and M may be arranged on the next least significant bit side. When the size of the message is too small or too large, the size may be adjusted using the scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the operation is made, that is, a size of an effective area may also be adjusted.

According to the embodiment, a modulus q of the encrypted message may be set and used in various forms. For example, the modulus of the encrypted message may be set in the form of an exponential power $q=\Delta^L$ of the scaling factor Δ. When Δ is 2, Δ may be set to a value such as $q=2^{10}$.

In addition, the homomorphic encrypted message according to the present disclosure is described on the assumption that a fixed point is used, but may be applied even when a floating point is used.

According to the embodiment, the server 100 may perform the calculation several times. In this case, proportions of approximate messages within the calculation result encrypted messages obtained for each calculation are different. The server 100 may perform a bootstrapping operation when the proportions of the approximate messages exceed a threshold value. In this way, the server 100 may be referred to as a calculation device in that it may perform a calculation operation.

Specifically, when q is less than M in Equation 1 described above, since M+e (mod q) has a different value from M+e, the decryption becomes impossible. Therefore, the q value should always be kept greater than M. However, as the operation progresses, the q value gradually decreases. Therefore, an operation of changing the q value so that the q value is always greater than M is required, and this operation is called the bootstrapping operation. As the bootstrapping operation is performed, the encrypted message may become calculable again.

Meanwhile, the processor 130 may store the generated homomorphic encrypted message in the memory 120. In addition, the processor 130 may transmit the homomorphic encrypted message to other electronic devices according to a user request or a preset default command.

The processor 130 may decrypt the homomorphic encrypted message to generate the message. For example, when the homomorphic encrypted message needs to be decrypted, the processor 130 may apply a secret key to the homomorphic encrypted message to generate a polynomial-type decrypted message, and decode the polynomial-type decrypted message to generate a message. In this case, the generated message may include an error as mentioned in Equation 1 described above.

In addition, the processor 130 may perform the calculation on the encrypted message. In this case, the processor 130 may perform calculations such as addition or multiplication on the homomorphic encrypted message while maintaining the encrypted state. For example, when the calculation on the homomorphic encrypted message is required, the processor 130 may perform the addition or multiplication calculation on the plurality of homomorphic encrypted messages.

As described above, according to the present embodiment, the homomorphic encrypted message may be generated in the message, and the stability of the message may be improved even when the calculation is required. In addition, since the generated homomorphic encrypted message includes errors, the stable security may be maintained even for biometric information that requires high security.

Meanwhile, when the calculation is completed, the processor 130 may detect data in an effective area from the calculation result data. Specifically, the processor 130 may detect the data in the effective area by performing rounding processing on the calculation result data. The rounding processing means rounding-off a message in an encrypted state, and may also be referred to as rescaling.

Specifically, the processor 130 removes a noise area by multiplying each component of the encrypted message by $\Delta^{-1}$ which is the reciprocal of the scaling factor, and rounding-off each component of the encrypted message. The noise area may be determined to correspond to the size of the scaling factor. As a result, it is possible to detect a message in the effective area from which the noise area is excluded. Since it proceeds in the encrypted state, an additional error occurs, but the size is small enough to be ignored.

Figure 3:
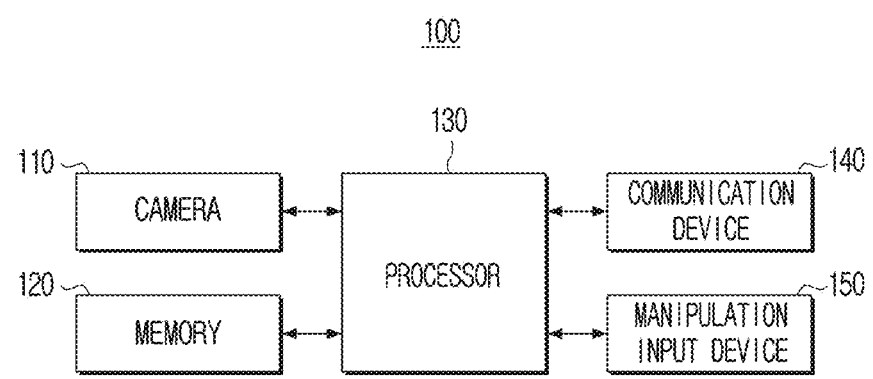
FIG. 3 is a block diagram illustrating a specific configuration of the server according to the embodiment of the present disclosure.

FIG. 3 is a block diagram illustrating a specific configuration of the server according to the embodiment of the present disclosure.

Referring to FIG. 3, the server 100 may include the camera 110, the memory 120, the processor 130, a communication device 140, and a manipulation input device 150. However, such a configuration is an example, and it goes without saying that a new configuration may be added or some configuration may be omitted in addition to such a configuration in carrying out the present disclosure. A detailed description for components overlapping components illustrated in FIG. 2 among components illustrated in FIG. 3 will be omitted.

The communication device 140 may perform data communication with the external electronic device under the control of the processor 130. The external electronic device may include a server (e.g., key server 200), a smartphone, a tablet, a game player, a PC, a laptop PC, a home server, a kiosk, home appliances with IoT functions, etc.

The communication device 140 may connect the server 100 to the external electronic device. For example, the electronic device 140 may be connected to the external electronic device through a local area network (LAN) or an Internet network, or is connected to the external electronic device via a universal serial bus (USB) port or a wireless communication (e.g., WiFi 802.11a/b/g/n, NFC, Bluetooth) port. Such a communication device 140 may also be referred to as a transceiver.

For example, the communication device 140 may use a communication circuit that uses at least one of the data communication methods including wired LAN, wireless LAN, Wi-Fi, Wi-Fi Direct, Bluetooth, ZigBee, Wi-Fi direct (WFD), and infrared data association (IrDA), Bluetooth low energy (BLE), near field communication (NFC), wireless broadband Internet (Wibro), world interoperability for microwave access (WiMAX), shared wireless access protocol (SWAP), wireless gigabit alliances (WiGig), and RF communications to perform data communication between the server 100 and the external electronic device.

The communication device 140 may receive the public key and the encrypted database from the external electronic device, and transmit the public key and secret key generated by the server 100 to the external electronic device.

The communication device 140 may receive the message from the external electronic device, and transmit the generated homomorphic encrypted message and the calculation result encrypted message acquired by calculating the homomorphic encrypted message to the external electronic device. In addition, the communication device 140 may receive various parameters required for generating the encrypted message from the external electronic device.

The manipulation input device 150 may receive a function selection of the server 100 and a control command for the corresponding function from the user. For example, the manipulation input device 150 may receive parameters necessary for generating a secret key and a public key from the user. Also, the manipulation input device 150 may receive the message to be encrypted from the user. Meanwhile, in implementation, the encryption target may be directly selected by a user or may be automatically selected.

The manipulation input device 150 may include various types of input devices. For example, the manipulation input device 150 may be implemented as a keyboard, a mouse, a touch screen, etc.

Specific operations in which the server 100 generates the encrypted database and identifies the user using the encrypted database will be described in detail through drawings and descriptions described later.

Figure 4:
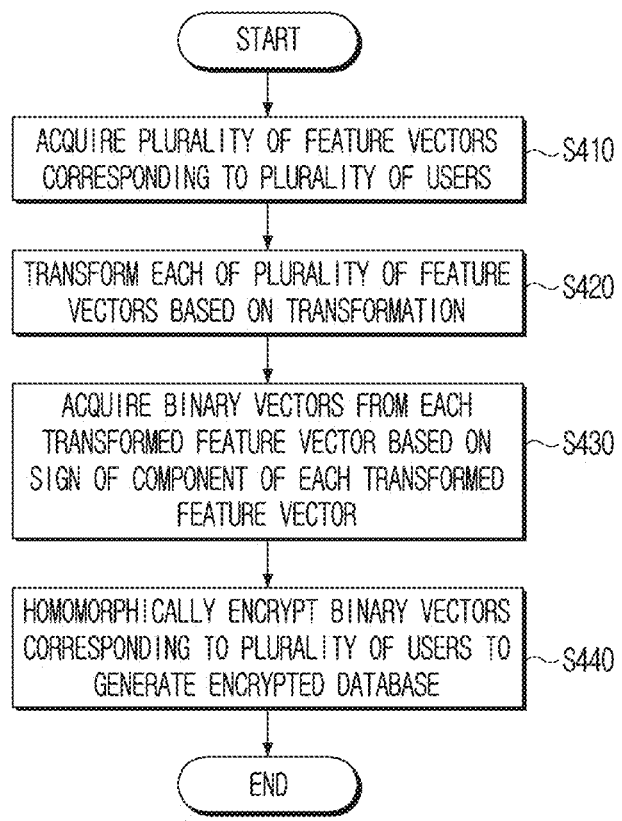
FIG. 4 is a flowchart for describing a method of generating, by a server, an encrypted database according to an embodiment of the present disclosure.

FIG. 4 is a flowchart for describing a method of generating, by a server, generate an encrypted database according to an embodiment of the present disclosure.

Generating the encrypted database by the server may be expressed as enrolling a plurality of users.

In operation S410, the processor 130 may acquire a plurality of feature vectors corresponding to a plurality of users.

For example, the processor 130 may acquire a plurality of images obtained by capturing a user's face using the camera 110, or receive the plurality of images obtained by capturing the user's face from the external electronic device through the communication device 140. The processor 130 may acquire the feature vector for the user's face from the image obtained by capturing the user's face using the feature extractor. The feature extractor includes a deep learning-based face recognition model and may be stored in the memory 120.

For example, the feature vector may be a vector defined on a d-dimensional hypersphere. Accordingly, the feature vector may be composed of d components. According to the present disclosure, d may be 512, for example.

In operation S420, the processor 130 may transform each of the plurality of feature vectors using transformation.

Transformation $T_\alpha$ may transform the component of the feature vector into 1, −1, or 0 depending on the magnitude and sign of the component of the feature vector.

Specifically, the transformation $T_\alpha$ may be a transformation for transforming $\alpha$ components in order of a largest absolute value among the components of the feature vector into 1 or −1 depending on the signs of the components and transforming the remaining components into 0. Accordingly, the feature vector transformed by the transformation may be composed of $\alpha$ non-zero components. According to the present disclosure, $\alpha$ may be 341, for example.

FIG. 5 is a diagram for describing an example in which a feature vector x defined on a d-dimensional hypersphere $S^{d-1}$ is transformed by the transformation $T_\alpha$. In FIG. 5, it is assumed that d=10 and $\alpha$=5.

Referring to FIG. 5, the feature vector x is equal to x=(0.45, −0.7, 0.05, 0.8, 0.03, −0.02, 0.23, −0.07, 0.01, −0.31) 510. In this case, taking the absolute values of the components of the feature vector x, x=(0.45, 0.7, 0.05, 0.8, 0.03, 0.02, 0.23, 0.07, 0.01, 0.31) 520. Among the components whose absolute values are taken, five (=$\alpha$) components whose the size is large are 0.45, 0.7, 0.8, 0.23, and 0.31. Among the five components, 0.45, 0.8, and 0.23 are components with a positive sign in the feature vector x, and 0.7 and 0.31 are components with a negative sign in the feature vector x.

Accordingly, the processor 130 may replace 0.45, 0.8, and 0.23 of the feature vector x with 1, replace 0.7, 0.31 of the feature vector x with −1, and replaces the remaining components of the feature vector, that is, 0.05, 0.03, 0.02, 0.07, and 0.01 with 0 to transform the feature vector x. Consequently, when the feature vector x is transformed by the transformation $T_\alpha$, $T_\alpha(x)$=(1, −1, 0, 1, 0, 0, 1, 0, 0, −1) 530.

In this way, the processor 130 may transform each feature vector by applying the transformation to each of the plurality of feature vectors.

In operation S430, the processor 130 may acquire binary vectors from each transformed feature vector based on the signs of the components of each transformed feature vector.

The binary vectors may include a first binary vector and a second binary vector. The first binary vector is a vector in which a component with a size of 1 is replaced with 1 and a component with a size of 0 and −1 is replaced with 0 among the components of the transformed feature vector. In addition, the second binary vector is a vector in which a component with a size of −1 is replaced with 1 and a component with a size of 1 and 0 is replaced with 0 among the components of the transformed feature vector.

For example, assume that the feature vector x transformed by the transformation is x=$(x_1, x_2, \ldots, x_d)$. In this case, each component of the transformed feature vector x may be 1, −1, or 0.

The processor 130 may encode the transformed feature vector x into a first binary vector $x^+$ and a second binary vector $x^-$. For example, when $1 \le i \le d$ and $x_i$ is a component of the transformed feature vector of the user, the processor 130 may acquire the first binary vector $x^+$=$(x_1^+, x_2^+, \ldots, x_d^+)$ based on $x_i^+$=$(|x_i|+x_i)/2$, and acquire the second binary vector $x^-$=$(x_1^-, x_2^-, \ldots, x_d^-)$ based on $x_i^-$=$(|x_i|-x_i)/2$ In this case, x=$x^+$−$x^-$.

Figure 6:
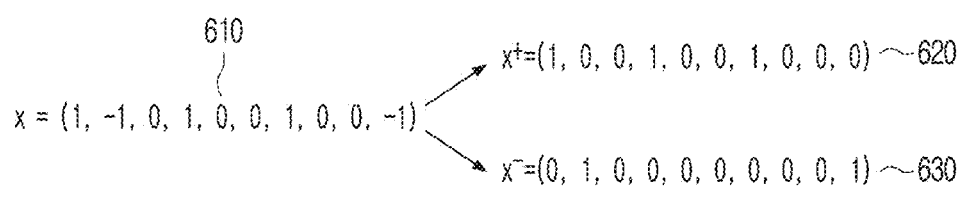

For example, referring to FIG. 6, the feature vector x transformed by the transformation $T_\alpha$ is equal to (1, −1, 0, 1, 0, 0, 1, 0, 0, −1) 610. The processor 130 may acquire the first binary vector $x^+$ and the second binary vector $x^-$ from the transformed feature vector x. For example, the first binary vector $x^+$ is (1, 0, 0, 1, 0, 0, 1, 0, 0, 0) 620 and the second binary vector $x^-$ is (0, 1, 0, 0, 0, 0, 0, 0, 0, 1) 630.

Accordingly, the processor 130 may transform the plurality of feature vectors of the plurality of users to acquire the plurality of transformed feature vectors, and acquire the plurality of first binary vectors and the plurality of second binary vectors from the plurality of transformed feature vectors.

In operation S440, the processor 130 may homomorphically encrypt the binary vectors corresponding to the plurality of users to generate the encrypted database. The encrypted database may include the encrypted first database and the encrypted second database.

For example, the processor 130 may encrypt the plurality of first binary vectors acquired from the plurality of transformed feature vectors to generate the encrypted first database, and encrypt the plurality of second binary vectors acquired from the plurality of transformed feature vectors to generate the encrypted second database.

Specifically, the processor 130 may generate a first matrix including the components of the plurality of first binary vectors, and homomorphically encrypt each of the plurality of columns of the first matrix in a column direction to generate the encrypted first database. In addition, the processor 130 may generate a second matrix including the components of the plurality of second binary vectors, and homomorphically encrypt each of the plurality of columns of the second matrix in the column direction to generate the encrypted second database.

Figure 7:
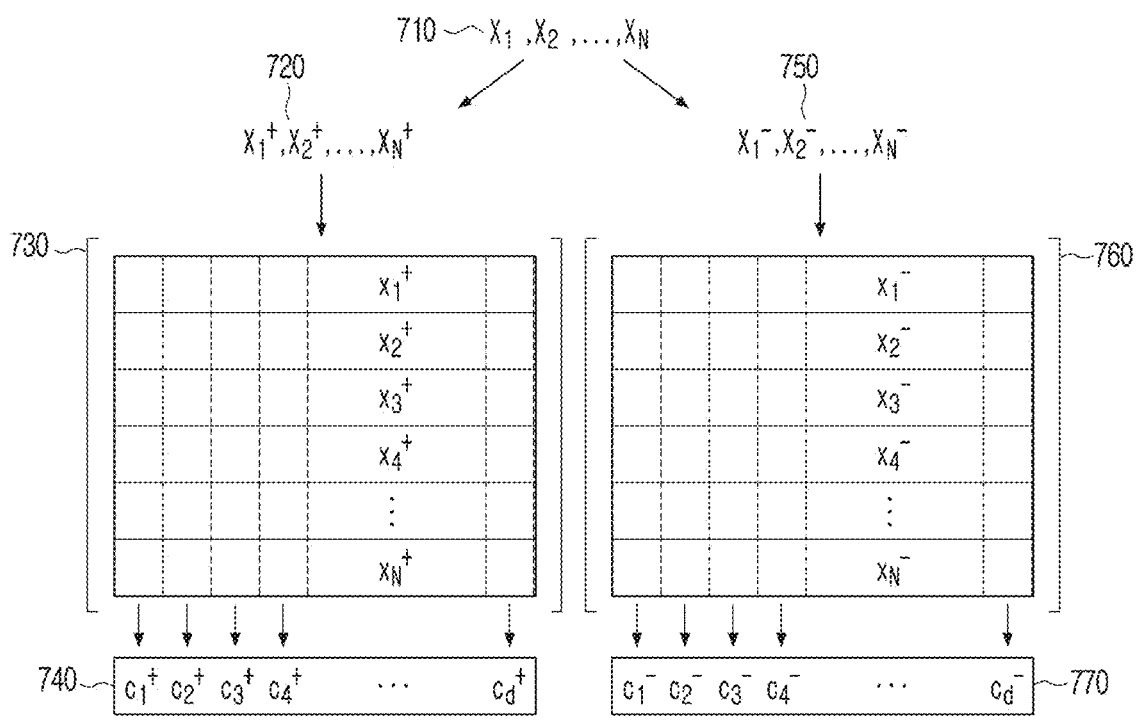
FIG. 7 is a diagram for describing an example of generating an encrypted database according to an embodiment of the present disclosure.

For example, referring to FIG. 7, the processor 130 may acquire N first binary vectors $x_1^+, x_2^+, \ldots, x_N^+$ 720 from N transformed feature vectors $x_1, x_2, \ldots, x_N$ 710 corresponding to N users. In addition, the processor 130 may generate a first matrix $N^+$730 using N first binary vectors $x_1^+, x_2^+, \ldots, x_N^+$ 720. The first matrix $N^+$730 may be composed of N components of the first binary vector. The processor 130 may homomorphically encrypt each column of the first matrix $N^+$730 in the column direction to generate the encrypted first database $c_1^+, c_2^+, \ldots, c_d^+$ 740. In this case, $c_1^+, c_2^+, \ldots, c_d^+$ are each vectors, and the components of the vector may include values obtained by encrypting column values.

In addition, referring to FIG. 7, the processor 130 may acquire N second binary vectors $x_1^-, x_2^-, \ldots, x_N^-$ 750 from N transformed feature vectors $x_1, x_2, \ldots, x_N$ 710 corresponding to N users. The processor 130 may generate a second matrix $N^-$ 760 using N second binary vectors $x_1^+, x_2^+, \ldots, x_N^+$ 750. The second matrix $N^-$ 760 may be composed of N components of the second binary vector. The processor 130 may homomorphically encrypt each column of the second matrix $N^-$ 760 in the column direction to generate the encrypted second database $c_1^-, c_2^-, \ldots, c_d^-$ 770. In this case, $c_1^-, c_2^-, \ldots, c_d^-$ are each vectors, and the components of the vector may include values obtained by encrypting column values.

Accordingly, the processor 130 may generate the encrypted database. The processor 130 may store the encrypted database in the memory 120.

Figure 8:
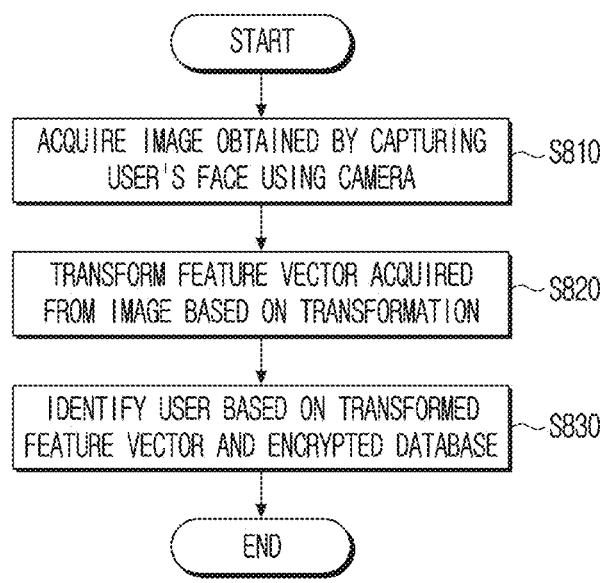
FIG. 8 is a flowchart illustrating a method of identifying, by a server, a user using an encrypted database according to an embodiment of the present disclosure.

FIG. 8 is a flowchart illustrating a method of identifying, by a server, a user using an encrypted database according to an embodiment of the present disclosure.

In operation S810, the processor 130 may acquire an image obtained by capturing the target user's face using the camera 110. For example, the processor 130 may perform the capturing using the camera 110 to acquire the image obtained by capturing the target user's face. Here, the target user may include a user to be identified.

In operation S820, the processor 130 may transform a feature vector acquired from an image based on the transformation.

For example, the processor 130 may acquire the feature vector from the image obtained by capturing the user's face using the feature extractor. The feature extractor includes a deep learning-based face recognition model and may be stored in the memory 120.

As described above, the feature vector may be a vector defined on a d-dimensional hypersphere. Accordingly, the feature vector may be composed of d components. According to the present disclosure, d may be 512, for example.

The transformation $T_\alpha$ may transform the component of the feature vector into 1, −1, or 0 depending on the magnitude and sign of the component of the feature vector. Specifically, the transformation $T_\alpha$ may be a transformation for transforming α components in order of a largest absolute value among the components of the feature vector into 1 or −1 depending on the signs of the components and transforming the remaining components into 0. Accordingly, the feature vector transformed by the transformation may be composed of α non-zero components. According to the present disclosure, a may be 341, for example. Meanwhile, the method of transforming the feature vector using the transformation is the same as described above, detailed description thereof will be omitted.

In operation S830, the processor 130 may identify the target user based on the transformed feature vector and the encrypted database.

Identifying the target user may include identifying whether the target user is a user registered in the encrypted database. For example, the processor 130 may identify which user the target user is among a plurality of users included in the encrypted database.

The processor 130 may perform the inner product operation between each feature vector of the plurality of users and the feature vector of the target user based on the transformed feature vector of the target user and the encrypted database to identify the target user.

To this end, the processor 130 may acquire the binary vectors from the transformed feature vector of the target user based on the signs of the components of the transformed feature vector of the target user.

The binary vectors may include the first binary vector and the second binary vector. The first binary vector is a vector in which a component with a size of 1 is replaced with 1 and a component with a size of 0 and −1 is replaced with 0 among the components of the transformed feature vector. In addition, the second binary vector is a vector in which a component with a size of −1 is replaced with 1 and a component with a size of 1 and 0 is replaced with 0 among the components of the transformed feature vector.

For example, assume that the feature vector y transformed by the transformation is $y=(y_1, y_2, \ldots, y_d)$. In this case, when $1 \leq i \leq d$ and $y_i$ is a component of the transformed feature vector of the target user, the processor 130 may acquire the first binary vector $y^+=(y_1^+, y_2^+, \ldots, y_d^+)$ based on $y_i^+=(|y_i|+y_i)/2$, and acquire the second binary vector $y^-=(y_1^-, y_2^-, \ldots, y_d^-)$ based on $y_i^-=(|y_i|-y_i)/2$ In this case, $y=y^+-y^-$. Meanwhile, since the method of obtaining the first and second binary vectors from the transformed feature vector is the same as described above, detailed description will be omitted.

In addition, the processor 130 may perform the inner product operation between the feature vectors of each of the plurality of users and the feature vector of the target user based on the first binary vector, the second binary vector, and the encrypted database.

As described above, the encrypted database may include the encrypted first database generated based on the first binary vectors acquired from the plurality of feature vectors of the plurality of users and the encrypted second database generated based on the second binary vectors acquired from the plurality of feature vectors of the plurality of users.

In this case, the processor 130 may perform the inner product operation based on Equation 9 below.

$$\langle x, y \rangle = \langle x^+, y^+ \rangle + \langle x^-, y^- \rangle - \langle x^+, y^- \rangle - \langle x^-, y^+ \rangle \quad \text{[Equation 9]}$$

Here, y may be the transformed feature vector of the target user, $y^+, y^-$ may be the first and second binary vectors acquired from the transformed feature vector of the target user, x may be the transformed feature vectors of each of the plurality of users, and $x^+, x^-$ may be the first and second binary vectors acquired from the transformed feature vectors of each of the plurality of users.

For example, the first binary vector $y^+$ and the second binary vector y acquired from the feature vector of the target user may each be represented by $y^+=(y_1^+, y_2^+, \ldots, y_d^+)$, $y^-=(y_1^-, y_2^-, \ldots, y_d^-)$.

Also, assume that the encrypted database is composed of N users. In this case, as illustrated in FIG. 7, the components of each of the N first binary vectors $x_1^+, x_2^+, \ldots, x_N^+$ corresponding to N users are encrypted, and the encrypted first database $c_1^+, c_2^+, \ldots, c_d^+$ may be configured. In addition, the components of each of N second binary vectors $x_1^-, x_2^-, \ldots, x_N^-$ corresponding to N users may be encrypted, and the encrypted second database $c_1^-, c_2^-, \ldots, c_d^-$ may be configured.

In this case, $\langle x+,y+\rangle = c1+\times y1++c2+\times y2++ \ldots +cd+\times yd+$, $\langle x-,y-\rangle = c1-\times y1-+c2-\times y2-+ \ldots +cd-\times yd-$, $\langle x+,y-\rangle = c1+\times y1-+c2+\times y2-+ \ldots +cd+\times yd-$ and, $\langle x-,y+\rangle = c1-\times y1++c2-\times y2++ \ldots +cd-\times yd+$. Here, × is multiplication in the homomorphic encryption, and + is addition in the homomorphic encryption. Accordingly, in the disclosure, an operation may be quickly performed at smaller cost than in a method of operating by utilizing both of a multiplication and an addition in a homomorphic encryption. For example, explaining based on $c1+\times y1+$ as an example, the value of the binary vector $y1+$ is 0 or 1. Accordingly, if $y1+$ is 1, $c1+\times y1+$ is identical to $c1+$, and thus a multiplication operation becomes unnecessary in $c1+\times y1+$. Also, if $y1+$ is 0, the value of $c1+\times y1+$ is a result value of encrypting 0.

Accordingly, in an addition operation of the homomorphic encryption which is continued after that, c1+xy1+ is identical to adding 0, and thus the corresponding value itself does not need to be calculated when performing the operation. Therefore, according to the disclosure, values of <x+, y+>, <X−, y−>, <x+,y−>, and <x−, y+> may be calculated without using a multiplication in a homomorphic encryption, and accordingly, there is an advantage that an operation is performed with small cost.

The homomorphic encrypted message may perform calculations such as addition or multiplication in the encrypted state. Accordingly, the processor 130 may perform the inner product operation between the feature vectors of each of the plurality of users and the feature vector of the target user based on Equation 9.

For example, assume the database encrypted using the feature vectors of three users, that is, a feature vector $x_1=(x_{1-1}, x_{1-2}, x_{1-3})$ of a first user, a feature vector $x_2=(x_{2-1}, x_{2-2}, x_{2-3})$ of a second user, the feature vector $x_3=(x_{3-1}, x_{3-2}, x_{3-3})$ of the third user is configured.

The encrypted database may include the encrypted first database $c_1^+, c_2^+, c_3^+$ and the encrypted second database $c_1^-, c_2^-, c_3^-$.

In this case, when the first binary vector $x_1^+$ acquired from the feature vector $x_1$ of the first user is $x_{1-1}^+, x_{1-2}^+, x_{1-3}^+$, the first binary vector $x2^+$ acquired from the feature vector $x_2^+$ of the second user is $x_{2-1}^+, x_{2-2}^+, x_{2-3}^+$, and the first binary vector $x_3^+$ acquired from the feature vector $x_3$ of the third user is $x_{3-1}^+, x_{3-2}^+, x_{3-3}^+$, $$c_1^+ = \begin{bmatrix} ct(x_{1-1}^+) \\ ct(x_{2-1}^+) \\ ct(x_{3-1}^+) \end{bmatrix}, c_2^+ = \begin{bmatrix} ct(x_{1-2}^+) \\ ct(x_{2-2}^+) \\ ct(x_{3-2}^+) \end{bmatrix}, c_3^+ = \begin{bmatrix} ct(x_{1-3}^+) \\ ct(x_{2-3}^+) \\ ct(x_{3-3}^+) \end{bmatrix}.$$

Here, ct( ) represents the encrypted state.

In this case, when the second binary vector $x_1^-$ acquired from the feature vector $x_1$ of the first user is $x_{1-1}^-, x_{1-2}^-, x_{1-3}^-$, the second binary vector acquired from the feature vector of the second user $x_2$ is $x_{2-1}^-, x_{2-2}^-, x_{2-3}^-$, and the second binary vector $x_3^-$ acquired from the feature vector $x_3$ of the third user is $x_{3-1}^-, x_{3-2}^-, x_{3-3}^-$, $$c_1^- = \begin{bmatrix} ct(x_{1-1}^-) \\ ct(x_{2-1}^-) \\ ct(x_{3-1}^-) \end{bmatrix}, c_2^- = \begin{bmatrix} ct(x_{1-2}^-) \\ ct(x_{2-2}^-) \\ ct(x_{3-2}^-) \end{bmatrix}, c_3^- = \begin{bmatrix} ct(x_{1-3}^-) \\ ct(x_{2-3}^-) \\ ct(x_{3-3}^-) \end{bmatrix}.$$

Here, ct( ) represents the encrypted state.

The processor 130 may acquire a first binary vector $y^+=(y_1^+, y_2^+, y_3^+)$ and a second binary vector $y^-=(y_1^-, y_2^-, y_3^-)$ from the feature vector y=(y1, y2, y3) of the target user, and use a first binary vector $y^+=(y_1^+, y_2^+, y_3^+)$, a second binary vector $y^-=(y_1^-, y_2^-, y_3^-)$, an encrypted first database $c_1^+, c_2^+, c_3^+$, and an encrypted first database $c_1^-, c_2^-, c_3^-$, to perform the inner product operation between the feature vectors of each of the three users constituting the encrypted database and the feature vector of the target user.

For example, the processor 130 may calculate <x,y>=<x+, y+>+<x−,y−>−<x+,y−>−<x−,y+> based on Equation 9.

Here, $<x^+,y^+>=c_1^+ \times y_1^+ + c_2^+ \times y_2^+ + c_3^+ \times y_3^+$, $<x^-,y^->=c_1^- \times y_1^- + c_2^- \times y_2^- + c_3^- \times y_3^-$, $<x^+,y^->=c_1^+ \times y_1^- + c_2^+ \times y_2^- + c_3^+ \times y_3^-$, and $<x^-,y^+>=c_1^- \times y_1^+ + c_2^- \times y_2^+ + c_3^- \times y_3^+$.

When the calculation result value of <x,y> is $$\begin{bmatrix} ct(z_1) \\ ct(z_2) \\ ct(z_3) \end{bmatrix},$$

$ct(z_1)$ may represent the state in which the inner product value between the feature vector $x_1$ of the first user and the feature vector y of the target user is encrypted, $ct(z_2)$ may represent the state in which the inner product value between the feature vector $x_2$ of the second user and the feature vector y of the target user is encrypted, and $ct(z_3)$ may represent a state in which the inner product value between the feature vector $x_3$ of the third user and the feature vector y of the target user is encrypted.

In this way, the processor 130 may perform the inner product operation between the feature vectors of each of the plurality of users and the feature vector of the target user.

The processor 130 may identify the user based on the inner product operation. For example, the processor 130 may transmit a calculation result encrypted message, which is a result value acquired by the inner product operation, to the key server 200 using the communication device 140. In this case, the key server 200 may decrypt the calculation result encrypted message to acquire the inner product value between the feature vector of the target user and the feature vectors of each of the plurality of users constituting the encrypted database. Then, the key server 200 may transmit the acquired inner product values to the server 100.

The processor 130 may receive the inner product values from the key server 200 through the communication device 140 and identify the target user based on the inner product values. For example, the processor 130 may identify inner product values that are greater than a threshold value among the received inner product values, and identify a user with the largest inner product value among the identified inner product values as the target user.

However, the present disclosure is not limited thereto, and when the secret key is stored in the memory 120, the processor 130 may directly decrypt the calculation result encrypted message to acquire the inner product value between the feature vector of the target user and the feature vectors of each of the plurality of users constituting the encrypted database.

In this way, in the present disclosure, the target user may be identified using the inner product between the feature vectors. In this case, since the present disclosure converts the feature vector into the binary vector composed of 1 and 0 and performs the inner product operation, the inner product operation may be performed quickly. In this case, when the dimension d of the feature vector and a of the transformation $T_\alpha$ are appropriately set (e.g., d=512, α=341), the distance relationships may be preserved substantially without much difference in practice even if the feature vector is transformed into the binary vector. Therefore, according to the present disclosure, the inner product operation may be performed quickly without the deterioration in accuracy.

According to an embodiment, the processor 130 may encode the plurality of feature vectors into one message slot to minimize waste of plain text space for the homomorphic encryption.

In this case, the processor 130 may determine the number of feature vectors to be encoded at once in the message slot according to the maximum value of the inner product value between the feature vectors and the size of the message.

For example, when the magnitude of the component of the d-dimensional transformed feature vector $x_i$ is smaller than $2^q$, the inner product value between the feature vectors is smaller than $d(2^q-1)^2$. Here, when the message space of the message slot for the homomorphic encryption is 2", up to m feature vectors may be encoded at once in the message slot. Here, $$m = \left\lfloor \frac{n}{\log d(2^q - 1)^2} \right\rfloor$$

and log is logarithm of base 2. Accordingly, m d-dimensional transformed feature vectors xi* may be merged into a feature vector x*. For $* \in \{+, -\}$, $$x^* = \sum_{i=1}^{m} p^{i-1} \cdot x_i^*$$

and $p=d(2^q-1)^2$, and $x_1^* = x^* \pmod{p}$ is calculated, and for i=2, ..., m, $$x_i^* = x^* - \sum_{j=1}^{i-1}(p^{j-1} \cdot x_j^*)(\bmod p)$$

is calculated, each feature vector $x_i^*$ may be decoded from the feature vector x*.

According to an example, when α of the transformation $T_\alpha$ is 341, the maximum value of the inner product value between the feature vectors is 341. In this case, 341 is a number that may be expressed by 9 bits. Accordingly, the processor 130 may encode the plurality of feature vectors in the message slot at once when the message space of the message slot is larger than 9 bits.

For example, assume that the message space of the message slot is 18 bits and that the encrypted database is configured using the feature vectors of three users.

Figure 9A:
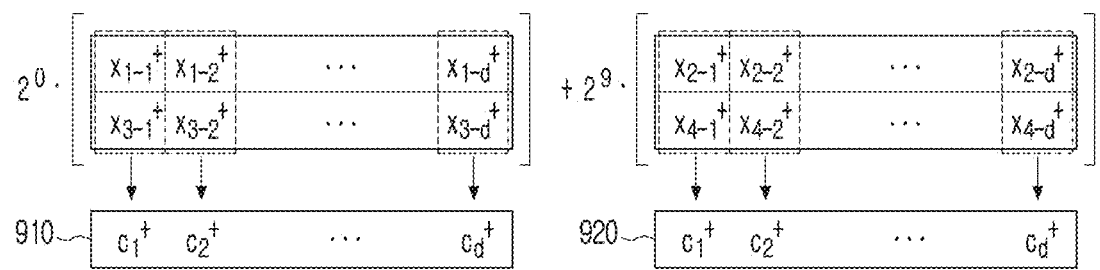
FIGS. 9A and 9B are diagrams for describing an example of a method of improving space efficiency of a message slot according to an embodiment of the present disclosure.

In this case, as illustrated in FIG. 9A, the processor 130 may merge the first binary vector $x_1^+ = (x_{1-1}^+, x_{1-2}^+, \ldots, x_{1-d}^+)$ acquired from the feature vector of the first user and the first binary vector $x_2^+ = (x_{2-1}^+, x_{2-2}^+, \ldots, x_{2-d}^+)$ acquired from the feature vector of the second user into one feature vector, and merge the first binary vector $x_3^+ = (x_{3-1}^+, x_{3-2}^+, \ldots, x_{3-d}^+)$ acquired from the feature vector of the third user and the first binary vector $x_4^+ = (x_{4-1}^+, x_{4-2}^+, \ldots, x_{4-d}^+)$ acquired from the feature vector of the fourth user into one feature vector. The processor 130 may encrypt the merged feature vectors to generate the encrypted first database $(2^0 \times (c_1^+, c_2^+, \ldots, c_d^+) \ 910 + 2^9 \times (c_1^+, c_2^+, \ldots, c_d^+) \ \mathbf{920})$.

Figure 9B:
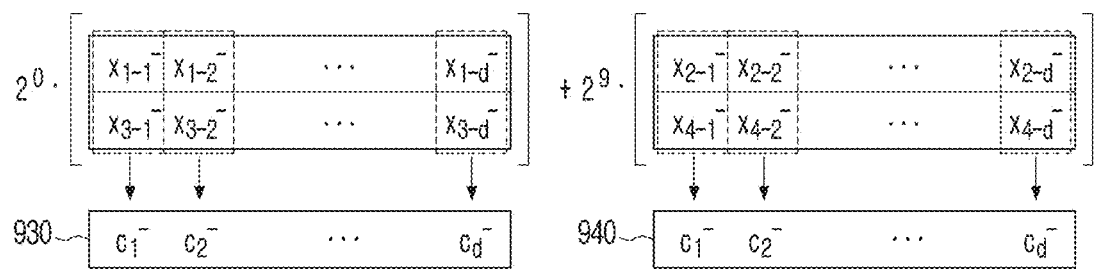

In addition, as illustrated in FIG. 9B, the processor 130 may merge the second binary vector $x_1^- = (x_{1-1}^-, x_{1-2}^-, \ldots, x_{1-d}^-)$ acquired from the feature vector of the first user and the second binary vector $x_2^- = (x_{2-1}^-, x_{2-2}^-, \ldots, x_{2-d}^-)$ acquired from the feature vector of the second user into one feature vector, and merge the second binary vector $x_3^- = (x_{3-1}^-, x_{3-2}^-, \ldots, x_{3-d}^-)$ acquired from the feature vector of the third user and the first binary vector $x_4^- = (x_{4-1}^-, x_{4-2}^-, \ldots, x_{4-d}^-)$ acquired from the feature vector of the fourth user into one feature vector. The processor 130 may encrypt the merged feature vectors to generate the encrypted second database $(2^0 \times (c_1^-, c_2^-, \ldots, c_d^-) \ \mathbf{930} + 2^9 \times (c_1^-, c_2^-, \ldots, c_d^-) \ \mathbf{940})$.

The processor 130 may perform the inner product operation between the feature vectors of each of the four users and the feature vector of the target user based on the encrypted first and second databases, the first binary vector $y^+ = (y_1^+, y_2^+, \ldots, y_d^+)$ of the target user, and the second binary vector $y^- = (y_1^-, y_2^-, \ldots, y_d^-)$. In this case, the inner product operation can be performed based on Equation 9.

In this case, when the calculation result value of $<x,y>$ is $$\begin{bmatrix} 2^0 \cdot ct(z_1) + 2^9 \cdot ct(z_2) \\ 2^0 \cdot ct(z_3) + 2^9 \cdot ct(z_4) \end{bmatrix},$$

$ct(z_1)$ may represent the state in which the inner product value between the feature vector $x_1$ of the first user and the feature vector y of the target user is encrypted, $ct(z_2)$ may represent the state in which the inner product value between the feature vector $x_2$ of the second user and the feature vector y of the target user is encrypted, $ct(z_3)$ may represent a state in which the inner product value between the feature vector $x_3$ of the third user and the feature vector y of the target user is encrypted, and $ct(z_4)$ may represent a state in which the inner product value between the feature vector $x_4$ of the fourth user and the feature vector y of the target user is encrypted.

Accordingly, the processor 130 may identify the target user using the calculation result value. As such, in the present disclosure, since the plurality of feature vectors are encoded in one message slot (e.g., batch encoding), the inner product operation may be quickly performed for many users while minimizing the waste of the plain text space.

Meanwhile, various embodiments of the present disclosure described above may be implemented in a computer or a computer readable recording medium using software, hardware, or a combination of software and hardware. In some cases, embodiments described in the present disclosure may be implemented by the processor itself. According to a software implementation, embodiments such as procedures and functions described in the disclosure may be implemented by separate software modules. Each of the software modules may perform one or more functions and operations described in the disclosure.

Meanwhile, computer instructions for performing processing operations of the electronic devices according to the diverse embodiments of the disclosure described above may be stored in a non-transitory computer-readable medium. The computer instructions stored in the non-transitory computer-readable medium allow a specific device to perform the processing operations of the electronic device 100 according to various embodiments described above when they are executed by a processor of the specific device.

The non-transitory computer-readable medium is not a medium that stores data for a while, such as a register, a cache, a memory, or the like, but means a medium that semi-permanently stores data and is readable by the apparatus. A specific example of the non-transitory computer-readable medium may include a compact disk (CD), a digital versatile disk (DVD), a hard disk, a Blu-ray disk, a universal serial bus (USB), a memory card, a read only memory (ROM), or the like.

Although embodiments of the present disclosure have been illustrated and described hereinabove, the present disclosure is not limited to the abovementioned specific embodiments, but may be variously modified by those skilled in the art to which the present disclosure pertains without departing from the gist of the present disclosure as disclosed in the accompanying claims. These modified implementations should not be understood individually from the technical idea or perspective of the present disclosure.

The invention claimed is:

1. A server, comprising:
a camera;
a memory configured to store an encrypted database generated based on a plurality of feature vectors corresponding to a plurality of users; and
a processor configured to acquire an image obtained by capturing a target user's face using the camera, transform a feature vector acquired from the image based on transformation and identify the target user based on the transformed feature vector and the encrypted database,
wherein the encrypted database is generated by transforming the plurality of feature vectors based on the transformation and homomorphically encrypting the plurality of transformed feature vectors, and
the transformation transforms components of the feature vectors into 1, −1, or 0 depending on magnitudes and signs of the components of the feature vectors,
wherein the processor is configured to acquire a first binary vector and a second binary vector from the transformed feature vector of the target user based on the signs of the components of the transformed feature vector of the target user and perform the inner product operation between the feature vectors of each of the plurality of users and the feature vector of the target user based on the first binary vector, the second binary vector, and the encrypted database,
the encrypted database includes an encrypted first database and an encrypted second database,
the encrypted first database is generated by encrypting the plurality of first binary vectors acquired from the plurality of transformed feature vectors, and
the encrypted second database is generated by encrypting the plurality of second binary vectors acquired from the plurality of transformed feature vectors,
wherein the processor is configured to perform the inner product operation based on Equation below:

$$\langle x, y \rangle = \langle x^+, y^+ \rangle + \langle x^-, y^- \rangle - \langle x^+, y^- \rangle - \langle x^-, y^+ \rangle$$

here, y is the transformed feature vector of the target user, $y^+, y^-$ are the first and second binary vectors acquired from the transformed feature vector of the target user, x is the transformed feature vectors of each of the plurality of users, and $x^+, x^-$ are the first and second binary vectors acquired from the transformed feature vectors of each of the plurality of users.

2. The server as claimed in claim 1, wherein the transformation is a transformation for transforming a components in order of a largest absolute value among the components of the feature vector into 1 or −1 depending on the signs of the components and transforming the remaining components into 0.

3. A method of identifying a target user by a server storing an encrypted database generated based on a plurality of feature vectors corresponding to a plurality of users, the method comprising:
acquiring an image obtained by capturing a target user's face using a camera;
transforming the feature vector acquired from the image based on a transformation; and
identifying the target user based on the transformed feature vector and the encrypted database,
wherein the encrypted database is generated by transforming the plurality of feature vectors based on the transformation and homomorphically encrypting the plurality of transformed feature vectors, and
the transformation transforms components of the feature vectors into 1, −1, or 0 depending on magnitudes and signs of the components of the feature vectors,
wherein the identifying includes:
acquiring a first binary vector and a second binary vector from the transformed feature vector of the target user based on the signs of the components of the transformed feature vector of the target user; and
performing the inner product operation between the feature vectors of each of the plurality of users and the feature vector of the target user based on the first binary vector, the second binary vector, and the encrypted database,
the encrypted database includes an encrypted first database and an encrypted second database,
the encrypted first database is generated by encrypting the plurality of first binary vectors acquired from the plurality of transformed feature vectors, and
the encrypted second database is generated by encrypting the plurality of second binary vectors acquired from the plurality of transformed feature vectors,
wherein in the performing, the inner product operation is performed based on Equation below:

$$\langle x, y \rangle = \langle x^+, y^+ \rangle + \langle x^-, y^- \rangle - \langle x^+, y^- \rangle - \langle x^-, y^+ \rangle$$

here, y is the transformed feature vector of the target user, $y^+, y^-$ are the first and second binary vectors acquired from the transformed feature vector of the target user, x is the transformed feature vectors of each of the plurality of users, and $x^+, x^-$ are the first and second binary vectors acquired from the transformed feature vectors of each of the plurality of users.

4. The method as claimed in claim 3, wherein the transformation is a transformation for transforming a components in order of a largest absolute value among the components of the feature vector into 1 or −1 depending on the signs of the components and transforming the remaining components into 0.

* * * * *